Dec. 27, 1960 R. C. LAMY 2,966,664
MAGNETIC CORE FLIP-FLOP
Filed Sept. 1, 1955

*INVENTOR.*
RICHARD C. LAMY
*BY*
William V. Schelberg
AGENT

United States Patent Office 2,966,664

Patented Dec. 27, 1960

2,966,664

MAGNETIC CORE FLIP-FLOP

Richard C. Lamy, Kenmore, N.Y., assignor to International Business Machines Corporation, New York, N.Y., a corporation of New York Filed Sept. 1, 1955, Ser. No. 531,950

1 Claim. (Cl. 340—174)

This invention relates to circuits having two stable states either of which may be selected by a control signal, and particularly to a flip-flop circuit employing saturable magnetic cores.

As a means for expressing information, the binary system has been generally employed in the computer art with dual state devices employed for storage of representations. Ideally such devices are solid state elements because of power requirements, development of heat, shock, resistance and other considerations and magnetic cores are adaptable for this purpose.

An object of the present invention is to provide a static flip-flop circuit employing only magnetic elements and which may be driven to either one of its two stable states with a minimum of effort and within a short time interval.

A further object of the invention is to provide a magnetic core flip-flop capable of delivering a controllable pulsed output.

Still another object of the invention is to provide a high speed magnetic core flip-flop device readily adapted for use in electronic computers.

Other objects of the invention will be pointed out in the following description and claims and illustrated in the accompanying drawings, which disclose, by way of example, the principle of the invention and the best mode, which has been contemplated of applying that principle.

Magnetic cores fabricated of a material having high remanence and low coercive force have been employed as memory elements with magnetization in one remanence direction representative of a binary one and in the other remanence direction representative of a binary zero. Windings placed about memory elements of such materials are pulsed to cause a change in the remanence state or flux direction to store and subsequently to determine the magnetic condition or state of storage.

In accordance with the present invention a flip-flop device is provided wherein the remanence state of a magnetic core is determined in a non-destructive manner somewhat along the principles described and claimed in the copending application, Serial No. 383,568, filed October 1, 1953, on behalf of E. A. Brown, now Patent No. 2,902,676, and which application is assigned to the same assignee.

Figure 1:
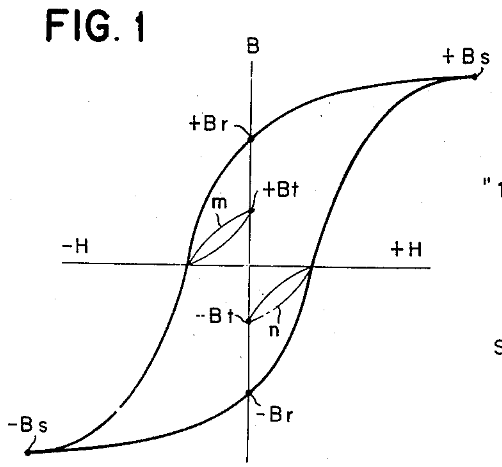
Figure 1 is an illustration of the hysteresis characteristic for a core of magnetic material suitable for employment in the flip-flop circuit.

With such a magnetic element the core material may exhibit a so called rectangular hysteresis characteristic, however, operation is not limited to such materials and the $B_r/B_s$ ratio may even be a relatively small fraction. A hysteresis curve of intermediate character is illustrated in Figure 1 where points $+B_r$ and $-B_r$ represent remanence points of opposite direction and points $+B_s$ and $-B_s$ opposite saturation points of these respective directions. With point $-B_r$ selected to represent a binary zero condition, application of a magnetomotive force in excess of the coercive force and in a positive sense causes a traversal of the loop to point $+B_s$ and thence to point $+B_r$ upon termination of the force whereupon a binary one is represented. Application of a current pulse to deliver a magnetomotive force of like magnitude in the opposite sense then causes a similar traversal of the curve through point $-B_s$ to point $-B_r$.

Figure 2:
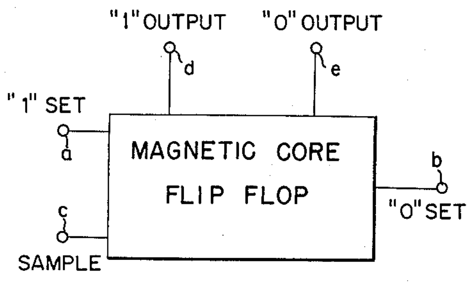
Figure 2 is a schematic diagram showing the external connections of the flip-flop device.

Referring now to the block diagram of Figure 2, the functions of the flip-flop device may be explained. Three input lines are provided to the device with terminals designated *a*, *b* and *c*. Two output lines are also shown with terminals labelled *d* and *e*.

Terminals *a* and *b* represent "1" set and "0" set, respectively, and are adapted to receive control signals that cause the device to attain one or the other of its two stable states. Terminal *c* is adapted to receive sample pulses either selectively or from a clock pulse source to develop an indication of the state attained by the device which indication appears on one or the other of the output terminals *d* or *e* substantially simultaneously depending on the state.

Figure 3:
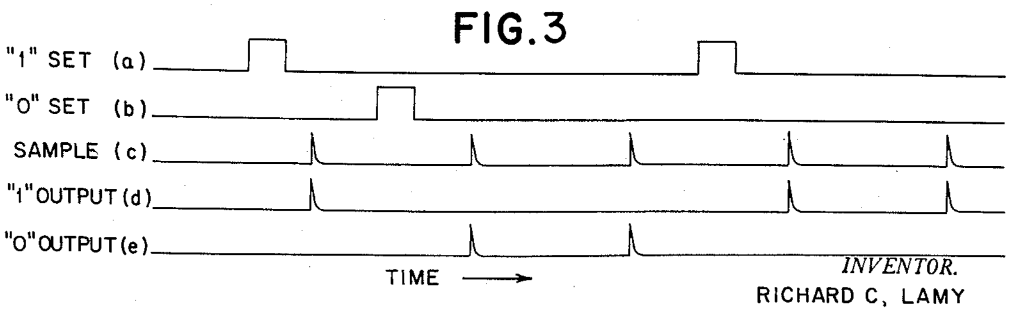
Figure 3 is a timing chart of electrical pulses illustrating the operation of the flip-flop.

If terminal *a* has received an input "1" set pulse of positive polarity, for example, then a positive polarity pulse appears on line *d* at sample pulse time as shown in Figure 3. At terminal *e* no output appears for this condition of the device. If terminal *b* now receives a "0" set input pulse, then a positive pulse appears at terminal *e* and no output is delivered to terminal *d* at sample pulse time. No limit is placed upon the number of output pulses delivered for either condition of the device since each sample pulse will cause development of an output pulse with the output line *d* or *e* determined by the previously received set pulse.

Figure 4:
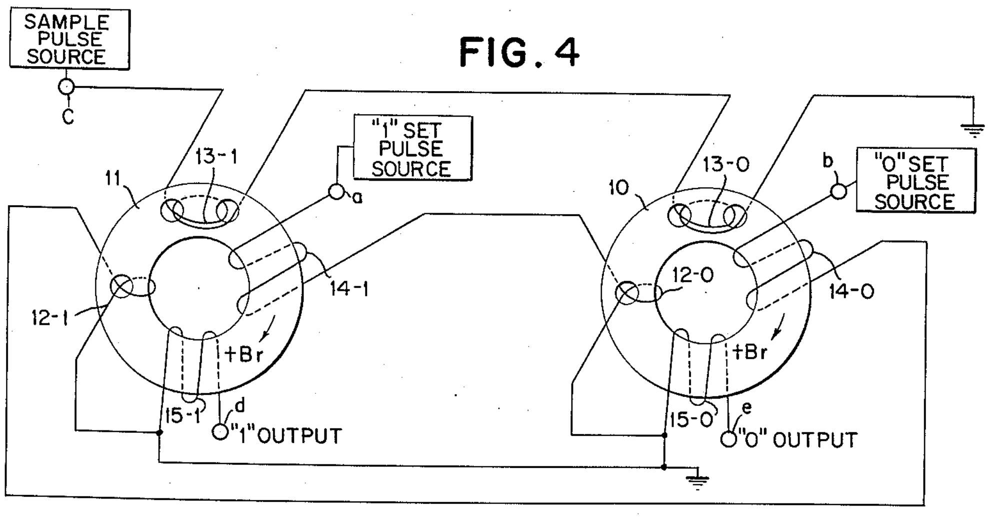
Figure 4 is a diagram of the novel magnetic core flip-flop circuit.

The circuit diagram of the flip-flop device is illustrated in Figure 4. Two toroidal magnetic cores designated 10 and 11 provide the essential components of the circuit and each is equipped with four windings which individually embrace a part or the whole magnetic circuit as shown. Windings 12–0 and 12–1 comprise figure eight windings which pass through an opening provided through the core leg preferably although not necessarily at its center. The hole may be positioned radially or as shown in the figure with the only requirement being that the flux path is divided. Windings 13–0 and 13–1 are wound through a pair of spaced holes likewise formed through the core and embrace that portion of the core intermediate the holes. These holes may also be positioned radially or at other angles with respect to the axis of the core. Further, the winding 13 may be positioned through a single hole as in the alternative arrangement described in the aforementioned copending application, Serial No. 383,568. Windings 14–0, 15–0 and 14–1, 15–1 are set and output windings, respectively, of toroidal form.

A single magnetic core with the winding arrangement thus far described forms the subject matter of copending application, Serial No. 530,522, filed August 25, 1955, on behalf of R. C. Lamy, now Patent No. 2,842,755. Invention in the present instance being the combination of two such cores and sets of windings in a circuit arrangement to operate as a flip-flop device as will be explained hereafter.

Briefly considering the operation of a single core, with winding 14 functioning as the input coil and winding 15 as the output coil, either winding 12 or 13 may be pulsed to develop an output dependent upon the residual magnetic state. With $+B_r$ stored by a positive pulse applied to coil 14, this information may be sampled nondestructively by pulsing either winding 12 or 13 with an output developed on coil 15. However, if winding 12 is pulsed first, then winding 13 is thereafter inhibited from sampling information out of the core while coil 12 retains its ability to sample and develops an output on coil 15 with each input pulse applied. Therefore, winding 13 is capable of sampling the state of the core until coil 12 is pulsed.

Energization of the figure eight winding 12 is believed to cause a traversal of the hysteresis characteristic so that a minor hysteresis loop excursion is made without change in the sense of polarization. For example, with the input winding 14 pulsed positively and the condition $+B_r$ established, the first pulse applied to winding 12 leaves the core standing at $+B_t$ and subsequent pulses causes traversal of the minor loop *m* with the state $B_t$ retained upon termination of each such pulse. Similarly, with $-B_r$ originally established, the pulses applied to winding 12 cause traversal of the minor loop *n* in the negative polarization region.

Energization of the winding 13 immediately after the core is set to one of the major remanence states $B_r$ is believed to set up an auxiliary flux circulation which may include the principal magnetic circuit as well as the localized regions surrounding the openings. This auxiliary flux is considered to alter the reluctance of the magnetic circuit with the regions between the outer periphery and the holes or the inner periphery and the holes more nearly saturated by the additional flux set up dependent upon the sense of the residual flux. The remanence flux of the core is varied as a result of this action so that a voltage is induced in the output winding 15 that is indicative of the residual history by relative phase. When the winding 12 has been previously energized as described above and the state of the core change to $\pm B_t$, it is considered that when the winding 13 is subsequently pulsed, a localized saturation is not attained with the result that the remanence flux is influenced to a lesser degree. A difference in output obtained under the two conditions provides a signal to noise level of approximately 10 to 1 before and after inhibiting or pulsing of winding 12.

It is obvious that the magnetic structure need not be limited to the toroidal shape used for illustration, but rectangular or other configurations of magnetic cores as well as the openings through which the windings pass are contemplated while retaining the principal features of the invention.

As shown in Figure 4 the "1" set winding 14–1 of core 11 is connected in series with the inhibit winding 12–0 of core 10 and the "0" set winding 14–0 of core 10 is connected in series with the inhibit winding 12–1 of core 11. The sample windings 13–0 and 13–1 of cores 10 and 11, respectively, are shown series connected, however, the coupling obviously may be in parallel.

In a practical embodiment, the cores 10 and 11 may be made of 4–79 Mo Permaloy having twenty laminations with the windings 12 and 13 comprising two turns and windings 14 and 15 five turns. Input set pulses may be provided by a 45 volt source in series with a ten ohm resistor and sample pulses provided by a thyratron driver with 700 milliampere output. These values are recited merely as an example of suitable constants and should not be considered limiting. Obviously they may be varied widely with core materials such as ferrites and/or variations in the number of winding turns.

Operation of the device may be described with both cores considered to be in a state represented at $-B_r$ in Figure 1. A positive pulse applied to the "1" set terminal *a* energizes winding 14–1 to drive core 11 to $+B_r$ and simultaneously energizes winding 12–0 of core 10 causing it to assume the point $-B_t$. A sample pulse applied to terminal *c*, energizes winding 13–1 and causes core 11 to develop an output on the "1" output terminal *d* resulting from a variation in reluctance of the core and the resultant flux change induces a voltage in winding 15–1. The sample pulse also energizes winding 13–0 of core 10 but no output is developed since the core 10 stands at $-B_t$ and no change in flux is developed.

With a positive pulse now applied to the "0" set terminal *b*, core 10 shifts from $-B_t$ to $+B_r$ and winding 12–1 is energized driving core 11 to $+B_t$. A succeeding sample pulse applied to terminal *c* now causes an output to develop at the "0" output terminal *e* and no output at the "1" output terminal *d*. Subsequent positive input pulses applied to terminals *a* and *b* cause the cores 10 and 11 to shift from $+B_r$ to $+B_t$ and vice versa. Negative input pulses would similarly cause a shift between points $-B_r$ to $-B_t$ with one core in one and the other core in the other state. With these states established, any number of sample pulses may be applied to develop the outputs as described. This feature is illustrated with two succeeding sample pulses following a "1" set input and a "0" set input in Figure 3.

While the flip-flop device described differs from conventional vacuum tube flip-flop devices not only in structure but in that pulses rather than D.C. levels of output are developed, the pulsed output may be produced at very high speed and at any desired time by control of the time of application of the sample pulses so that the device becomes a powerful tool as a logical element in the computer field.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intion therefore, to be limited only as indicated by the scope of the following claim.

What is claimed is:

A flip-flop circuit comprising a pair of magnetic cores having a central aperture and capable of assuming stable remanence conditions and each defining a a main circular closed magnetic flux path; three openings positioned through the main flux path of each of said cores so as to divide sections of said main flux paths into auxiliary parallel flux paths; input, output, sample and inhibit windings positioned about said flux paths; said input and output windings embracing the entire main flux path; said sample windings being positioned through two of said openings so as to embrace that portion of the core intermediate these openings; said inhibit windings being positioned through the third opening and wound in figure eight form so as to embrace one auxiliary parallel flux path in a one sense and the adjacent auxiliary parallel flux path in the opposite sense; circuit means connecting the input winding of each said core with the inhibit winding of the other core; further circuit means connecting the sample windings of each said core; means for selectively energizing said circuit means and subsequently energizing said further circuit means to develop a signal on the output winding of one of said cores indicative of previous energization of the circuit means associated with the input winding of one of said cores.

References Cited in the file of this patent

UNITED STATES PATENTS 2,802,953 Arsenault -------------- Aug. 13, 1957

OTHER REFERENCES

"The Theory of Magnetic Amplifiers and Some Recent Developments" (Smith), Journal of Scientific Instruments, vol. 25, pages 268–272, August 1948. (Copy in 340—174C (2) Div. 42.)

"Magnistor Circuits" (Synder), Electronic Design, pages 24–27, August 1955. (Copy in 340—174C (52) Div. 42.)

A new Nondestructive Read for Magnetic Cores (Thorensen et al.), 1955 Western Joint Computer Conference, August 1955. (Copy in 340–174C (44–A) Div. 42.)